(12) United States Patent
Conde

(10) Patent No.: US 6,834,462 B2
(45) Date of Patent: Dec. 28, 2004

(54) LANDSCAPE BORDER SEGMENT FOR CONFIGURABLE LANDSCAPE BORDERS

(75) Inventor: Clemente Conde, Waco, TX (US)

(73) Assignee: Easy Gardener Products, Ltd., Waco, TX (US)

( * ) Notice: Subject to any disclaimer, the term of this patent is extended or adjusted under 35 U.S.C. 154(b) by 7 days.

(21) Appl. No.: 10/039,920

(22) Filed: Nov. 7, 2001

(65) Prior Publication Data

US 2003/0024158 A1 Feb. 6, 2003

Related U.S. Application Data

(60) Provisional application No. 60/309,910, filed on Aug. 3, 2001.

(51) Int. Cl.⁷ .................................................. A01G 1/08
(52) U.S. Cl. .......................................................... 47/33
(58) Field of Search ..................... 47/33, 47; 52/102; 256/47, 1, 32, 33, 65; D8/1; 72/135; D25/45, 46

(56) References Cited

U.S. PATENT DOCUMENTS

| | | | | |
|---|---|---|---|---|
| 351,110 | A | * | 10/1886 | Horrocks ...................... 256/33 |
| 603,754 | A | * | 5/1898 | Baldwin ........................ 47/47 |
| 899,605 | A | * | 9/1908 | Miller .......................... 256/33 |
| 1,142,233 | A | * | 6/1915 | Bryning ....................... 256/33 |
| 2,600,666 | A | * | 6/1952 | Martensen ................... 256/33 |
| 2,670,182 | A | * | 2/1954 | Oberwerger .................. 256/1 |
| 2,673,072 | A | * | 3/1954 | Quinn .......................... 256/33 |
| 2,777,673 | A | * | 1/1957 | May, Jr. et al. ................ 256/33 |
| 3,378,949 | A | | 4/1968 | Dorris |
| 3,387,786 | A | | 6/1968 | Rynberk |
| 3,484,989 | A | | 12/1969 | Lazinsky |
| 3,485,449 | A | | 12/1969 | Wilson |
| 3,487,600 | A | | 1/1970 | Greene |
| 3,525,663 | A | | 8/1970 | Hale |
| 3,545,127 | A | | 12/1970 | Jensen |
| 3,701,477 | A | | 10/1972 | Matt et al. |
| 3,706,627 | A | | 12/1972 | Arne |
| 3,788,001 | A | | 1/1974 | Balfanz, Jr. |
| 3,841,022 | A | | 10/1974 | Thodos |
| 3,911,187 | A | | 10/1975 | Raley |
| 4,074,479 | A | | 2/1978 | Krupka |
| 4,146,666 | A | | 3/1979 | Houtlosser |
| 4,190,279 | A | | 2/1980 | Sguazzin |
| 4,281,473 | A | | 8/1981 | Emalfarb et al. |
| 4,321,769 | A | | 3/1982 | Tisbo et al. |
| 4,333,979 | A | | 6/1982 | Sciaraffa et al. |
| 4,397,902 | A | | 8/1983 | Resch |
| 4,644,685 | A | | 2/1987 | Tisbo et al. |
| 4,761,923 | A | | 8/1988 | Reum et al. |
| 4,858,379 | A | | 8/1989 | West |
| 4,939,865 | A | | 7/1990 | Whitcomb et al. |
| 4,955,156 | A | | 9/1990 | Williams |

(List continued on next page.)

FOREIGN PATENT DOCUMENTS

JP 409074903 A * 3/1997 ............ A01G/1/08

Primary Examiner—Son T. Nguyen
(74) Attorney, Agent, or Firm—O'Keefe, Egan & Peterman, LLP

(57) ABSTRACT

A landscape border segment is disclosed having a first end formed for insertion into the ground, a second end, and a transition region between the two. A connection feature is located proximate the second end and is formed to connect to another landscape border segment at varied locations between its transition region and first end. Further, the connection feature can also be formed to connect to the other landscape border segment at varied angles. In certain embodiments, the connection feature can be formed to connect to the other landscape border segment anywhere between its transition region and first end and at any angle except for angles in which the landscape border segments would physically overlap.

19 Claims, 2 Drawing Sheets

U.S. PATENT DOCUMENTS

| | | | |
|---|---|---|---|
| 4,965,097 A | 10/1990 | Bach | |
| 5,020,272 A | 6/1991 | Herrema et al. | |
| 5,117,583 A | 6/1992 | Reum | |
| 5,121,569 A | 6/1992 | Thomas | |
| 5,201,154 A | 4/1993 | Thomas | |
| 5,456,045 A | 10/1995 | Bradley et al. | |
| 5,775,027 A | 7/1998 | Tisbo et al. | |
| D407,507 S | 3/1999 | Owens, II et al. | |
| 5,921,021 A | 7/1999 | Coates | |
| D416,096 S | 11/1999 | Tisbo et al. | |
| D416,339 S | 11/1999 | Shaw | |
| D418,233 S | 12/1999 | Prassas et al. | |
| D426,322 S | 6/2000 | Anderson et al. | |
| 6,085,458 A | 7/2000 | Gau | |
| 6,138,406 A | 10/2000 | Clark, Jr. | |
| 6,195,926 B1 * | 3/2001 | Jarl et al. | 40/645 |
| D444,579 S | 7/2001 | Emalfarb | |
| 6,386,517 B1 * | 5/2002 | McNeill | 256/32 |
| 6,389,744 B1 * | 5/2002 | Pugh | 211/181.1 |

* cited by examiner

LANDSCAPE BORDER SEGMENT FOR CONFIGURABLE LANDSCAPE BORDERS

This application claims priority from Provisional Application Ser. No. 60/309,910 filed on Aug. 3, 2001, which is entitled "LANDSCAPE BORDER SEGMENT FOR CONFIGURABLE LANDSCAPE BORDERS," the disclosure of which is being incorporated herein by reference.

TECHNICAL FIELD OF THE INVENTION

This invention relates in general to the field of landscape edging for creating borders around gardens, flower beds, trees and other landscape features, and more particularly to a landscape border segment for configurable landscape borders.

BACKGROUND OF THE INVENTION

It is often desirable in landscapes to separate different landscape features with some form of border or edging. One conventional means for forming a distinct border between areas, such as a lawn area and a garden area, is the use of an edging device along the desired border. For example, conventional edging devices include continuous concrete edging, metal edging, plastic edging and other elongated, perhaps flexible edging devices. Landscape borders can also be defined by various forms of fencing, such as wood, metal and plastic fencing.

For some landscape needs, less costly alternatives can be used such as low height decorative fencing, edging or borders that can be both relatively inexpensive and easily installed. However, configurability can be a problem with such conventional solutions. During installation, it can be difficult to create a desired line and height for a decorative landscape border. Even if the desired configuration is achieved, later changing that configuration may be complicated and may involve similar time and effort as was required for the first installation. Further, some border segments that were cut or bent to fit the first configuration may not be reusable for the new configuration.

Often landscape borders are formed of an edging that helps prevent the mixing of two landscape features. For example, the edging prevent grass from entering a flower bed and likewise mulch from a flower bed from entering a lawn area. However, not all uses of edging or borders requires preventing landscape features from mixing. Thus within some landscapes, landscape borders are provided merely to delineate two regions or to provide a desired aesthetic look.

SUMMARY OF THE INVENTION

In accordance with the present invention, a landscape border segment is disclosed for configurable landscape borders that provides advantages over conventional landscape border solutions.

According to one aspect of the present invention, a landscape border segment comprises a first end formed for insertion into the ground, a second end, and a transition region between the two. A connection feature is located proximate the second end and is formed to connect to another landscape border segment at varied locations between its transition region and first end. Further, the connection feature can also be formed to connect to the other landscape border segment at varied angles.

According to another aspect of the present invention, the connection feature can be formed to connect to the other landscape border segment anywhere between its transition region and first end. And, the connection feature can be formed to connect at any angle except for angles in which the landscape border segments would physically overlap.

A technical advantage of the present invention is the ability to easily configure the line and height of a decorative border on a segment-by-segment basis. Further each segment can be relatively short in width along the border such that changes in line and height can be made frequently.

Another technical advantage of the present invention is the ability to easily reuse landscape border segments in new configurations. The landscape border segments can simply be removed from the ground, and then reinstalled in the desired new location and at the desired new height.

BRIEF DESCRIPTION OF THE DRAWINGS

For a more complete understanding of the present invention, and for further details and advantages thereof, reference is now made to the following description taken in conjunction with the accompanying drawings, in which.

DETAILED DESCRIPTION OF THE INVENTION

Figure 1:
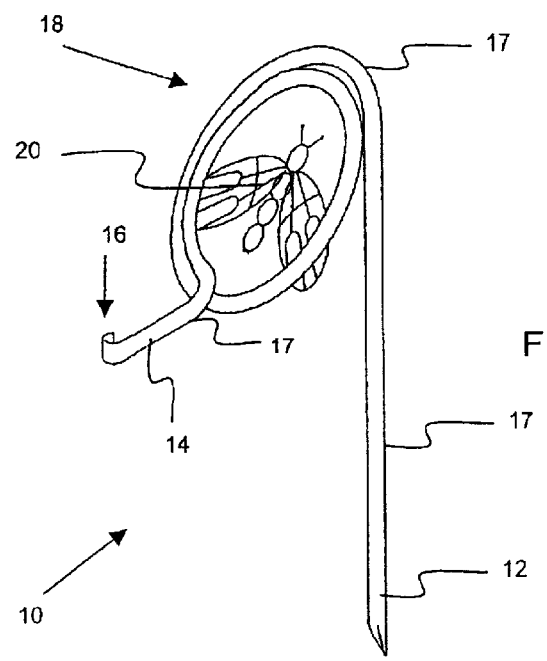
FIG. 1 is a perspective view of one embodiment of a landscape border segment for configurable landscape borders according to the present invention.

FIG. 1 is a perspective view of one embodiment of a landscape border segment, indicated generally at 10, for configurable landscape borders according to the present invention. Border segment 10 comprises a first end 12 that is intended to be inserted into the ground for installation. The first end 12 may be formed into a point as shown for assisting insertion. Border segment 10 comprises a second end 14 having a connection feature 16 for connecting border segment 10 to another border segment 10 adjacent to it.

In general, the border segment 10 may be an elongated rod-like shaped member 17. Between the first end 12 and the second end 14, the rod-like member 17 may be bent or curved. The curvature shown in FIG. 1 is exemplary and other bends, curves, and the like may be utilized. In the embodiment shown in FIGS. 1–4, the elongated rod-like member 17 may have a circular, cylindrical or round cross-section. However, the rod-like member may be formed with other non-circular cross-sectional shapes. For example, the rod-like member may have a square, rectangular, triangle, pentagon, hexagon etc. cross-sectional shape. In addition, the cross-sectional shape does not have to be constant throughout the length of the rod-like member. For example, a portion of the rod-like member may be circular and another portion may be non-circular.

In the embodiment of FIG. 1, border segment 10 is made from a tubular metal material. Exemplary metals that may be utilized include steel, iron, copper, steel coated with copper, or aluminum, however, other metals may be used. Alternatively, the border segment may be formed of other material sufficiently stiff such that the border segment may be inserted into the ground. For example, the other materials may include hard plastics. The border segment may have a hollow cavity or may be solid. The height of the border segment 18 may be any height desired, and the inventive features described herein are not limited to a particular geometric sizing. For example in one embodiment the border segment may be smaller than one foot in height or in another embodiment it may be multiple feet high for a larger border feature.

In the embodiment of FIG. 1, connection feature 16 is formed by a bend in and flattening of the metal tubular material at second end 14. The hook like end of connection feature 16 enables adjacent border segments to be engaged as will be described in more detail below. Many other suitable connection features could be used as well that would allow engaging two adjacent border members. The hook like end of connection feature 16 allows a first border segment 10 to be inserted in the ground prior to another border segment engaging the first border segment. However, such a connection is not required. For example, though perhaps less desirable the end of connection feature 16 may be circular and an adjacent border segment may have its second end 12 inserted through the connection feature 16 before the border segments are inserted in the ground.

Border segment 10 further comprises a transition region 18 that couples first end 12 and second end 14 together. In the embodiment of FIG. 1, transition region 18 comprises a curved loop structure in the tubular metal material between the two ends. The transition region 18 provides a transition from the direction of the rod-like member at the first end 12 to the direction of the rod-like member at the second end 14. Thus the axial direction of the rod-like member changes through the transition region from the axial direction at the first end to the axial direction of the second end. It will be recognized that transition region 18 need not be formed of the multiple loop shape as shown. For example a single loop or curve may be used. Similarly, additional loops may be formed. Alternatively, multiple discrete curves may be utilized. In yet another alternative, multiple bends at various angles may be used or even a single ninety degree bend may even be used. In the embodiment shown, the axial directions of the first end and the second end are offset by ninety degrees. However, other amounts of axial direction changes may by formed between the two ends.

As shown, a decorative feature 20 may be coupled to transition region 18 to provide an aesthetic feature for border segment 10. In this embodiment, decorative feature 20 comprises a wire butterfly centered in the curved loop structure of transition region 18 and connected at the butterfly wings. Decorative feature 20 can be fixedly or removably attached to border segment 10 depending upon whether re-configuration of decorative feature 20 is desired. Other decorative features may be utilized such as for example other insects, birds, animals, or objects. Alternatively the border segment may be formed without a decorative feature, since the inventive structural features described herein may be utilized without the decorative feature.

Figure 2:
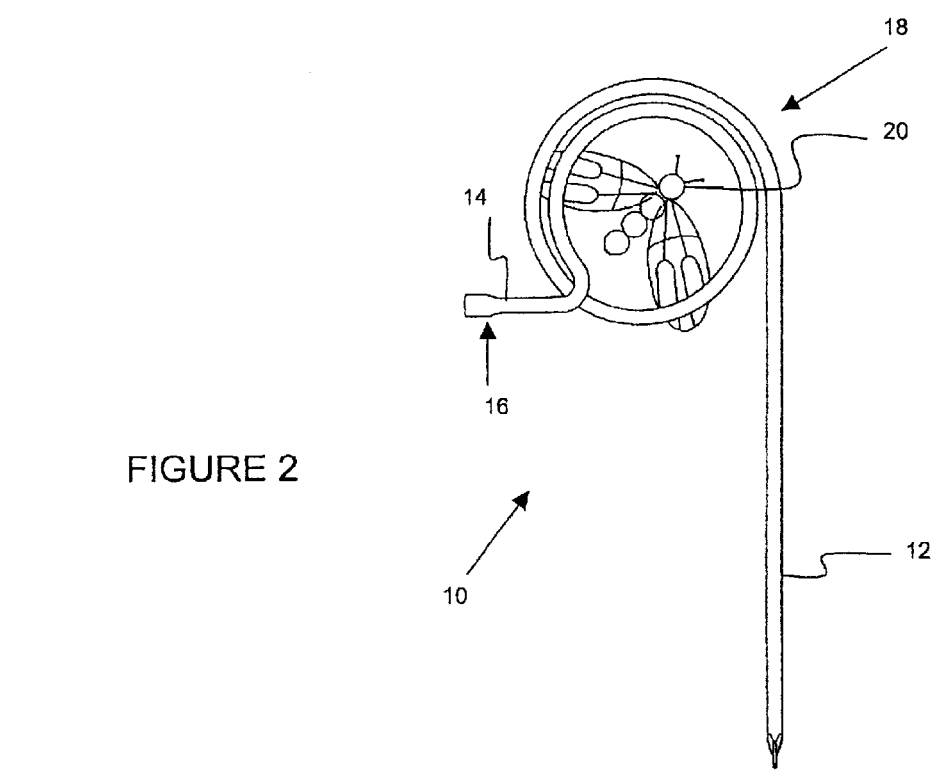
FIG. 2 is an elevation view of one embodiment of a landscape border segment for configurable landscape borders according to the present invention.

FIG. 2 is an elevation view of landscape border segment 10. Connection feature 16 is designed to allow border segment 10 to be connected to another border segment 10 at varied locations between transition region 18 and first end 12 (preferably above ground after installation). In the illustrated embodiment, these locations could actually be anywhere along the portion of border segment 10 between transition region 18 and the first end 12. The ability to connect along the length of border segment 10 at a variety of points of the rod-like member 17 allows each border segment 10 to be connected to an adjacent border segment 10 even if the two are positioned at widely different heights. This segment-by-segment configurability of height in a landscape border is a significant advantage over conventional landscape border segments.

Figure 3:
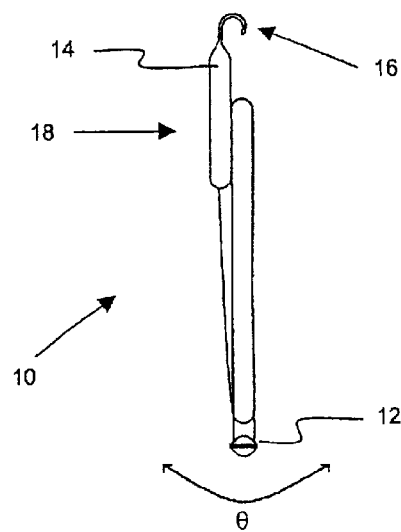
FIG. 3 is a top view of one embodiment of a landscape border segment for configurable landscape borders according to the present invention.

FIG. 3 is a top view of landscape border segment 10. As should be clear, connection feature 16 is designed to allow border segment 10 to be connected to an adjacent border segment 10 at varied angles. In fact, the illustrated embodiment can be connected at any angle except for those in which border segments 10 would physically overlap. In creating a landscape border from multiple border segments 10, it is possible to create a wide range of lines for the landscape border due to the ability easily to change angles on a segment-by-segment basis. For example, in this manner a series of the border segments may be coupled together to form a curving border Alternatively, a two adjacent border segments may be connected at a ninety degree angle if the use of the multiple border segments dictates an abrupt right angle turn of the multiple border segments. In this manner many of a wide range of potentially desirable patterns of for the total border may be configured from a plurality of the border segments. This configurability of line in a landscape border is a significant advantage over conventional landscape border segments.

Figure 4:
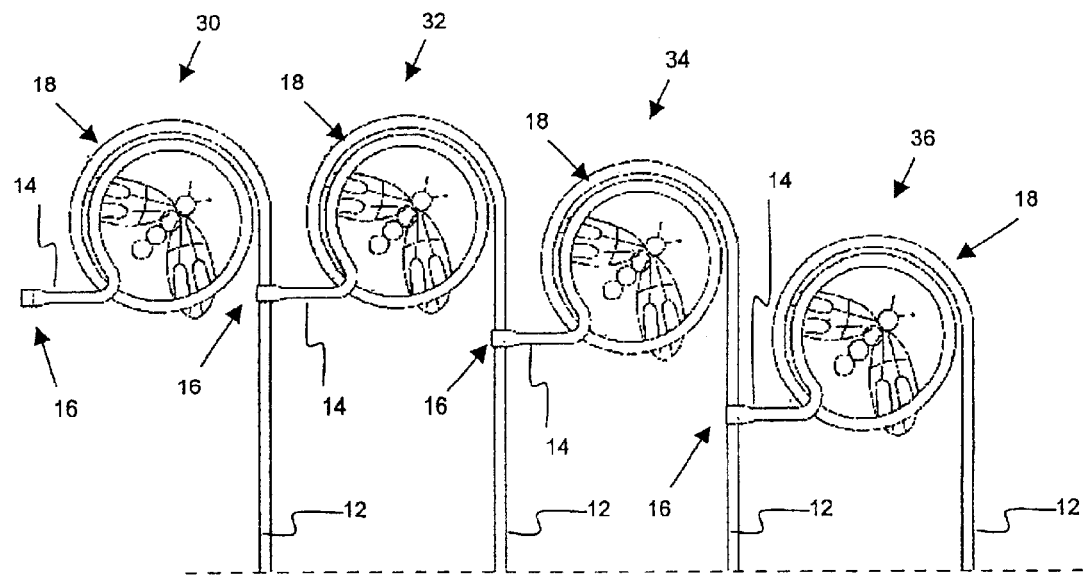
FIG. 4 is an elevation view of a plurality of landscape border segments connected to form a landscape border according to the present invention.

FIG. 4 is an elevation view of a plurality of landscape border segments 10 connected to form part of a landscape border. To install these border segments 10, a first border segment 30 can be inserted into the ground and positioned at the desired height and line. A second border segment 32 can then be positioned adjacent to the first border segment 30 and inserted into the ground to the desired height. Connection feature 16 of second border segment 32 can then be attached to first border segment 30 between transition region 18 and the ground. The same process can then be repeated for a third border segment 34 and a fourth border segment 36. As shown, these two border segments could be installed at different heights than the first two. In the embodiment of FIG. 4, the border segments are installed in a straight line design, but it should be understood that they could also be installed at differing angles to produced any desired curved line design. This segment-by-segment configuration of height and line allows installation to be done very easily to achieve a desired decorative look for the landscape border. Also, if it is determined that a new height or line is desired in the same or different location, the border segments can easily be removed from the ground and reinstalled. This ability to reconfigure and re-use landscape border segments is another technical advantage of the present invention over conventional landscape border devices.

Although the present invention has been described with respect to a preferred embodiment, various changes, substitutions and modifications of this invention may be suggested to one skilled in the art, and it is intended that the present invention encompass such changes, substitutions and modifications as fall within the scope of the appended claims.

What is claimed is:

1. A landscape border segment, comprising:
  a first end formed for insertion into the ground;
  a transition region coupled to the first end;
  a second end coupled to the transition region; and
  a connection feature located proximate the second end, the connection feature formed to connect to another landscape border segment at varied locations between its transition region and first end, wherein the transition region comprises a curved loop structure that exceeds 360 degrees in curvature between the terminating points of the transition region, the transition region terminating in first and second axial directions, the first and second axial directions being different such that the coupling of the first end and the transition region occurs in the first axial direction and the coupling of the second end and the transition region occurs in the second axial direction.

2. The landscape border segment of claim 1, wherein the connection feature is formed to connect to the other landscape border segment anywhere between its transition region and first end.

3. The landscape border segment of claim 1, wherein the connection feature is further formed to connect to the other landscape border segment at varied angles.

4. The landscape border segment of claim 3, wherein the connection feature is formed to connect to the other landscape border segment at any angle except for angles in which the landscape border segments would physically overlap.

5. The landscape border segment of claim 1, wherein the landscape border segment is constructed from a tubular metal material.

6. The landscape border segment of claim 5, the tubular metal material is shaped into a point at the first end for insertion into the ground.

7. The landscape border segment of claim 5, wherein the connection feature comprises a hook formed by bending and flattening of the tubular metal material.

8. The landscape border segment of claim 1, further comprising a decorative feature coupled to the transition region.

9. A landscape border segment, comprising:
a rod-like member having two opposing ends, respectively a first end and a second end, the first end being for insertion of the rod-like member into a landscape feature, the first end orientated in a first axial direction and the second end orientated in a second axial direction, the first and second axial directions being different;
a transition region in which the rod-like member transitions from the first axial direction to the second axial direction, wherein the transition region comprises a curved loop, the curved loop terminating in different axial directions, the curved loop exceeding 360 degrees in curvature between the terminating points of the transition region such that the terminating points of the curved loop are provided in the different axial directions; and
a connector located at the second end of the rod-like member, the connector configured to engage another rod-like member of another similarly configured landscape border segment.

10. The landscape border segment of claim 9 wherein at least a portion of the rod-like member has circular cross-section.

11. The landscape border segment of claim 9 wherein the rod-like member has a non-circular cross-section.

12. The landscape border segment of claim 9 wherein the first axial direction is ninety degrees offset from the second axial direction.

13. The landscape border segment of claim 9 wherein the connector is a hook structure.

14. The landscape border segment of claim 9 wherein a connection region of the rod-like member is formed between the transition region and the first end, wherein the connection region may engage a connector of an adjacent similar configured landscape border segment at a plurality of different locations within the connection region to enable various relative heights between two adjacent connected landscape border segments.

15. The landscape border segment of claim 9 wherein the connector may engage a rod-like member of an adjacent similarly configured landscape border segment at a variety of angles.

16. The landscape border segment of claim 15 wherein a connection region of the rod-like member is formed between the transition region and the first end, wherein the connection region may engage a connector of the adjacent similar configured landscape border segment at a plurality of different locations within the connection region to enable various relative heights between the two adjacent connected landscape border segments.

17. The landscape border segment of claim 9 wherein the transition region comprises at least one loop.

18. The landscape border segment of claim 9 further comprising a decorative feature coupled to the rod-like member.

19. The landscape border segment of claim 18 wherein the decorative feature is coupled to the transition region of the rod-like member.

* * * * *

UNITED STATES PATENT AND TRADEMARK OFFICE
CERTIFICATE OF CORRECTION

PATENT NO. : 6,834,462 B2
DATED : December 28, 2004
INVENTOR(S) : Clemente Conde It is certified that error appears in the above-identified patent and that said Letters Patent is hereby corrected as shown below:

Column 5,
Line 4, delete "first and second," and insert -- different --.
Lines 5-9, delete "the first and second axial directions being different such that the coupling of the first end and the transition region occurs in the first axial direction and the coupling of the second end and the transition region occurs in the second axial direction," and insert -- the transition region terminating at first and second termination locations such that the first end is in a first axial direction immediately adjacent to the transition region and the second end is in a second axial direction immediately adjacent to the transition region --.

Column 6,
Lines 1-3, delete "the terminating points of the curved loop are provided in the different axial directions" insert -- the first end is in a first axial direction immediately adjacent to the transition region and the second end is in a second axial direction immediately adjacent to the transition region --.

Signed and Sealed this

Twelfth Day of July, 2005

JON W. DUDAS
*Director of the United States Patent and Trademark Office*